(12) United States Patent
Kurimoto

(10) Patent No.: US 10,814,738 B2
(45) Date of Patent: Oct. 27, 2020

(54) INFORMATION COLLECTION SYSTEM FOR ELECTRIC STORAGE DEVICE

(71) Applicant: TOYOTA JIDOSHA KABUSHIKI KAISHA, Toyota-shi, Aichi-ken (JP)

(72) Inventor: Yasuhide Kurimoto, Kasugai (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 138 days.

(21) Appl. No.: 15/957,399

(22) Filed: Apr. 19, 2018

(65) Prior Publication Data

US 2018/0308300 A1 Oct. 25, 2018

(30) Foreign Application Priority Data

Apr. 20, 2017 (JP) .................................. 2017-083474
Mar. 29, 2018 (JP) .................................. 2018-064160

(51) Int. Cl.
*G07C 5/08* (2006.01)
*B60L 53/62* (2019.01)
(Continued)

(52) U.S. Cl.
CPC ............... *B60L 53/62* (2019.02); *B60L 53/65* (2019.02); *B60L 53/66* (2019.02); *B60L 58/10* (2019.02);
(Continued)

(58) Field of Classification Search
CPC ...... B60L 53/65; B60L 58/10; B60L 2240/62; B60L 2240/70; G06F 16/955;
(Continued)

(56) References Cited

U.S. PATENT DOCUMENTS 7,319,848 B2 * 1/2008 Obradovich ........... G01C 21/26
455/99
2003/0050755 A1 3/2003 Sakata et al.
(Continued)

FOREIGN PATENT DOCUMENTS

JP 2003-161771 A 6/2003
JP 2007-055450 A 3/2007
(Continued)

*Primary Examiner* — Anshul Sood
(74) *Attorney, Agent, or Firm* — Sughrue Mion, PLLC

(57) ABSTRACT

An information collection system for an electric storage device includes: a storage device in which registration information is stored, the registration information being information in which estimation information allowing an estimation of a position of an object vehicle and identification information identifying the object vehicle are associated with each other; and a computation device configured to store electric storage device information indicating information about an electric storage device equipped in each of the plurality of vehicle, in the storage device. The computation device is configured to acquire the estimation information associated with the identification information by referring to the registration information and associate at least a part of the estimation information with the electric storage device information, as the position information about the object vehicle, after the computation device receives the identification information from the communicator.

10 Claims, 14 Drawing Sheets

(51) Int. Cl.
  *G06F 16/955* (2019.01)
  *B60L 58/10* (2019.01)
  *B60L 53/65* (2019.01)
  *B60L 53/66* (2019.01)
  *G07C 5/00* (2006.01)

(52) U.S. Cl.
  CPC ........... *G06F 16/955* (2019.01); *G07C 5/008* (2013.01); *G07C 5/0841* (2013.01); *B60L 2240/62* (2013.01); *B60L 2240/70* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 30/14* (2013.01)

(58) Field of Classification Search
  CPC ... G07C 5/008; G07C 5/0841; Y02T 10/7005; Y02T 90/16; Y02T 90/162; Y02T 90/169; Y04S 30/14; H04W 4/029
  See application file for complete search history.

(56) References Cited

U.S. PATENT DOCUMENTS

| | | | |
|---|---|---|---|
| 2008/0294690 A1* | 11/2008 | McClellan | G01S 5/0027 |
| 2013/0015982 A1* | 1/2013 | Matsumoto | G06Q 50/06 340/870.02 |
| 2013/0317694 A1* | 11/2013 | Merg | G07C 5/008 701/31.6 |
| 2014/0225571 A1 | 8/2014 | Obata et al. | |
| 2015/0134167 A1* | 5/2015 | Won | B60L 53/68 701/22 |
| 2015/0268308 A1* | 9/2015 | Nakayama | G01L 7/00 702/50 |

FOREIGN PATENT DOCUMENTS

| | | |
|---|---|---|
| WO | 2012/140486 A2 | 10/2012 |
| WO | 2013/046263 A1 | 4/2013 |
| WO | 2014/147476 A1 | 9/2014 |

\* cited by examiner

FIG. 6B

| COMMUNICATOR ID | VEHICLE ID | BATTERY INFORMATION $B_1$ | BRIEF ADDRESS INFORMATION | TIME INFORMATION $t_1$ | $y'_1$ |
| COMMUNICATOR ID | VEHICLE ID | BATTERY INFORMATION $B_2$ | BRIEF ADDRESS INFORMATION | TIME INFORMATION $t_2$ | $y'_2$ |
| ⋮ | | | | | |
| COMMUNICATOR ID | VEHICLE ID | BATTERY INFORMATION $B_n$ | BRIEF ADDRESS INFORMATION | TIME INFORMATION $t_n$ | $y'_n$ |

$Y'$

INFORMATION COLLECTION SYSTEM FOR ELECTRIC STORAGE DEVICE

INCORPORATION BY REFERENCE

The disclosure of Japanese Patent Application Nos. 2018-064160 filed on Mar. 29, 2018 and 2017-083474 filed on Apr. 20, 2017 including the specification, drawings and abstract are incorporated herein by reference in their entirety.

BACKGROUND

1. Technical Field

The disclosure relates to an information collection system for an electric storage device.

2. Description of Related Art

In recent years, hybrid vehicles and electric vehicles have become popular. Electric storage devices for traveling that are equipped in the vehicles can deteriorate due to elapse of time or repeat of charge and discharge. Therefore, for exactly estimating the deterioration condition of the electric storage device, there can be a technique in which a server provided in the exterior of the vehicle collects "electric storage device information" about the condition or use situation of the electric storage device. The server collects and analyzes the electric storage device information, and thereby, for example, it is possible to estimate a life of the electric storage device and early detect a failure of the electric storage device.

For example, Japanese Patent Application Publication No. 2007-055450 (JP 2007-055450 A) discloses a configuration in which the server (a management center in JP 2007-055450 A) collects data (electric storage device information) relevant to a vehicle operation history including the voltage, current and temperature of the electric storage device and data relevant to position information about a vehicle through a wireless communication network.

SUMMARY

As disclosed in JP 2007-055450 A, it is desirable to collect the position information about the vehicle, in addition to the electric storage device information. This is because use environment of the electric storage device can be estimated from the position information about the vehicle. Specifically, from the position information about the vehicle, it is possible to estimate a temperature load on the electric storage device, and for example, it is possible to estimate that a region where the electric storage device is used (a region where the vehicle travels) is a hot region or a cold region, or is a region with a large temperature difference between day and night. Further, from the position information about the vehicle, it is possible to estimate a charge-discharge load on the electric storage device, and for example, it is possible to estimate that a region where the electric storage device is used is a region where a sudden acceleration or a sudden deceleration of the vehicle tends to occur (a region where a rapid charge-discharge of the electric storage device tends to occur).

In the configuration disclosed in JP 2007-055450 A, global positioning system (GPS) information about the vehicle (hereinafter, referred to as "GPS information") is collected as the position information about the vehicle. In recent years, the GPS information has a very high accuracy, and allows the position of the vehicle to be identified with an error of several meters. However, when the accuracy of the position information about the vehicle is high, the operation history of the vehicle (in other words, information about routes of movements of the user) is collected in excessive detail, and such a case can be undesirable from a standpoint of protection of privacy of the user.

Meanwhile, for use purposes of the electric storage device information (for example, for the estimation of the deterioration condition of the electric storage device), highly accurate position information such as the GPS information is often unnecessary. That is, the accuracy of the position information that is appropriate for the electric storage device information is sometimes different from the accuracy of the position information based on the GPS information.

The disclosure provides an information collection system that collects the information (electric storage device information) about the electric storage device equipped in each of a plurality of vehicles. The information collection system can collect the position information having an accuracy appropriate for the electric storage device information while protecting the privacy of the user.

An information collection system for an electric storage device according to a first aspect of the disclosure includes: a storage device in which registration information is stored, the registration information being information in which estimation information and identification information are associated with each other, the estimation information allowing an estimation of a position of an object vehicle, the identification information identifying the object vehicle of a plurality of vehicles, each of the plurality of vehicles including a communicator configured to send the identification information and electric storage device information indicating information about an electric storage device equipped in each of the plurality of vehicle, to the information collection system; and a computation device configured to store the electric storage device information in the storage device. The estimation information is information different from position information about the object vehicle by using a global positioning system, and the computation device is configured to acquire the estimation information associated with the identification information by referring to the registration information and associate at least a part of the estimation information with the electric storage device information, as the position information about the object vehicle, after the computation device receives the identification information from the communicator.

In the configuration, at least a part of the estimation information (as described later, address information about a user, address information about a store such as a dealer, regional information written on a number plate, and the like) is associated with the electric storage device information, as the position information about the object vehicle. The estimation information is information different from the GPS information, and the operation history of the vehicle (routes of movements of the user) is unknown from the estimation information. Thereby, it is possible to protect the privacy of the user, and therefore, it is likely to obtain user's approval about provision of the position information. The estimation information does not have a high accuracy compared to the GPS information, but has a sufficient accuracy for use purposes of the electric storage information. Accordingly, in the above configuration, it is possible to collect the position information having an accuracy appropriate for the electric storage device information while protecting the privacy of the user.

In the first aspect, the estimation information may be address information about a user of the object vehicle, and the computation device may be configured to extract extracted address information and associates the extracted address information with the electric storage device information, as the position information about the object vehicle, the extracted address information being a part of the address information about the user.

In the configuration, since a part of the address information about the user is extracted, the address information about the user that has a relatively lower position accuracy is associated with the electric storage device information, compared to the case where the address information about the user is used with no extraction. Thereby, it is possible to increase the degree of the protection of the privacy.

In the first aspect, the computation device may be configured to store, in the storage device, address information about the user that is previously acquired at a time of conclusion of a communication service contract concluded by the user.

In the first aspect, the computation device may be configured to store, in the storage device, address information about the user that is acquired at a time of at least one of sale, inspection, maintenance and repair of the object vehicle.

The address information about the user can be changed due to moving of the user or the like. In the configuration, the address information is acquired at the time of the conclusion of the communication service contract or at the time of at least one of sale, inspection, maintenance and repair of the vehicle. By using the opportunity of the acquisition of the address information, it is possible to appropriately update the address information about the user to the latest information.

In the first aspect, the estimation information may be address information about a store that performs at least one of sale, inspection, maintenance and repair of the object vehicle, and the computation device may be configured to extract at least a part of the address information about the store and associate the extracted address information with the electric storage device information, as the position information about the object vehicle.

In the first aspect, the estimation information may be regional information corresponding to a number plate of the object vehicle, and the computation device may be configured to associate the regional information with the electric storage device information, as the position information about the object vehicle.

In the configuration, it is possible to collect the position information having an accuracy appropriate for the electric storage device information while protecting the privacy of the user.

In the first aspect, the identification information may be identification information about the communicator.

An information collection system for an electric storage device according to a second aspect of the disclosure includes: a computation device configured to acquire electric storage device information about an object vehicle of a plurality of vehicles, by communication with a communicator provided in the object vehicle, the electric storage device information indicating information about an electric storage device equipped in the object vehicle; an input-output interface configured to connect the computation device and a storage device, the storage device configured to store registration information, the registration information being information in which identification information identifying the object vehicle and estimation information allowing an estimation of a position of the object vehicle are associated with each other. The estimation information is information different from position information about the object vehicle that is sent from a global positioning system, and the computation device is configured to acquire the estimation information associated with the identification information by referring to the registration information and store at least a part of the estimation information in the storage device in association with the electric storage device information, as the position information about the object vehicle, after the computation device receives the identification information from the communicator.

In the configuration, the storage device is provided in the exterior of the information collection system. Even in the configuration, it is possible to collect the position information having an accuracy appropriate for the electric storage device information while protecting the privacy of the user.

In the second aspect, the computation device may be positioned separately from the storage device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6B is a diagram for describing an update process for collected data Y that is stored in a battery information database, in the first embodiment;

DETAILED DESCRIPTION OF EMBODIMENTS

Figure 1:
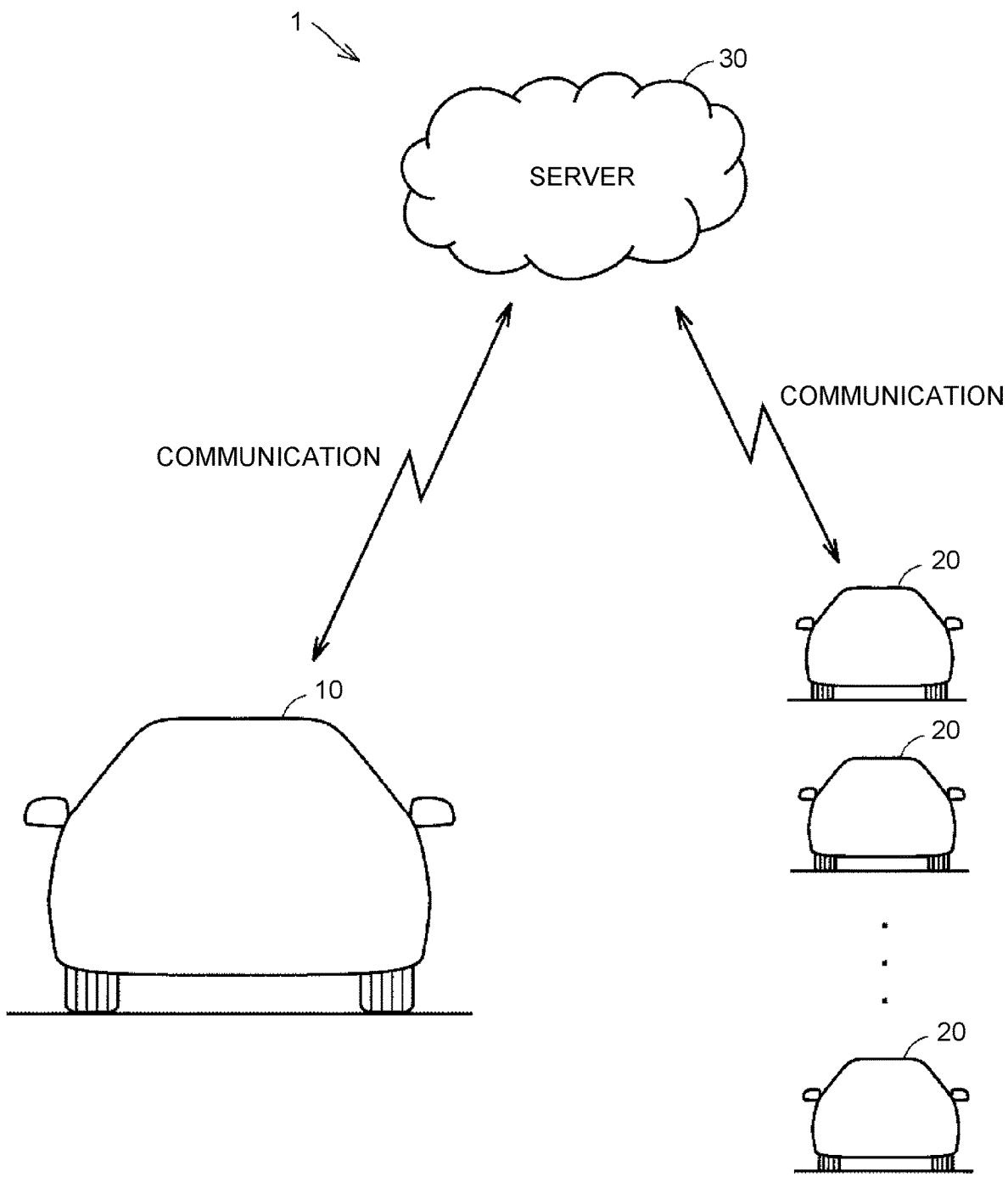
FIG. 1 is a diagram schematically showing the whole configuration of a battery information collection system according to a first embodiment.

Hereinafter, embodiments of the disclosure will be described in detail with reference to the drawings. In the drawings, identical reference characters are assigned to identical or equivalent parts, and repetitive descriptions are omitted.

In the embodiments described below, configurations each of which an assembled battery is employed as an "electric storage device" according to the disclosure will be described as examples. The assembled battery is constituted by a plurality of cells (electric cells) each of which is a secondary battery such as a lithium ion secondary battery or a nickel-hydrogen battery. Therefore, in the embodiments described below, "battery information" is collected as an example of the "electric storage device information" according to the disclosure. However, the electric storage device information according to the disclosure is not limited to the assembled battery, and may be a capacitor device including a plurality of electric double layer capacitor cells.

Embodiment

Configuration of Battery Information Collection System

FIG. 1 is a diagram schematically showing the whole configuration of a battery information collection system 1 according to a first embodiment. Each of a vehicle (object vehicle) 10 of a certain user and a plurality of other vehicles 20 is an electrically driven vehicle equipped with an assembled battery 110 (see FIG. 2). Specifically, each of the vehicles 10, 20 is one of a hybrid vehicle (including a plug-in hybrid vehicle), an electric vehicle, and a fuel cell vehicle.

The battery information collection system 1 includes a server 30. The vehicle 10 and the server 30 are configured to allow communication from the vehicle 10 to the server 30 or bi-directional communication. Each of the plurality of vehicles 20 and the server 30 are also configured to allow communication from the plurality of vehicles 20 to the server 30 or bi-directional communication. Thereby, the server 30 collects information (battery information) about the assembled battery 110 from the vehicle 10 and each of the plurality of vehicles 20.

Figure 2:
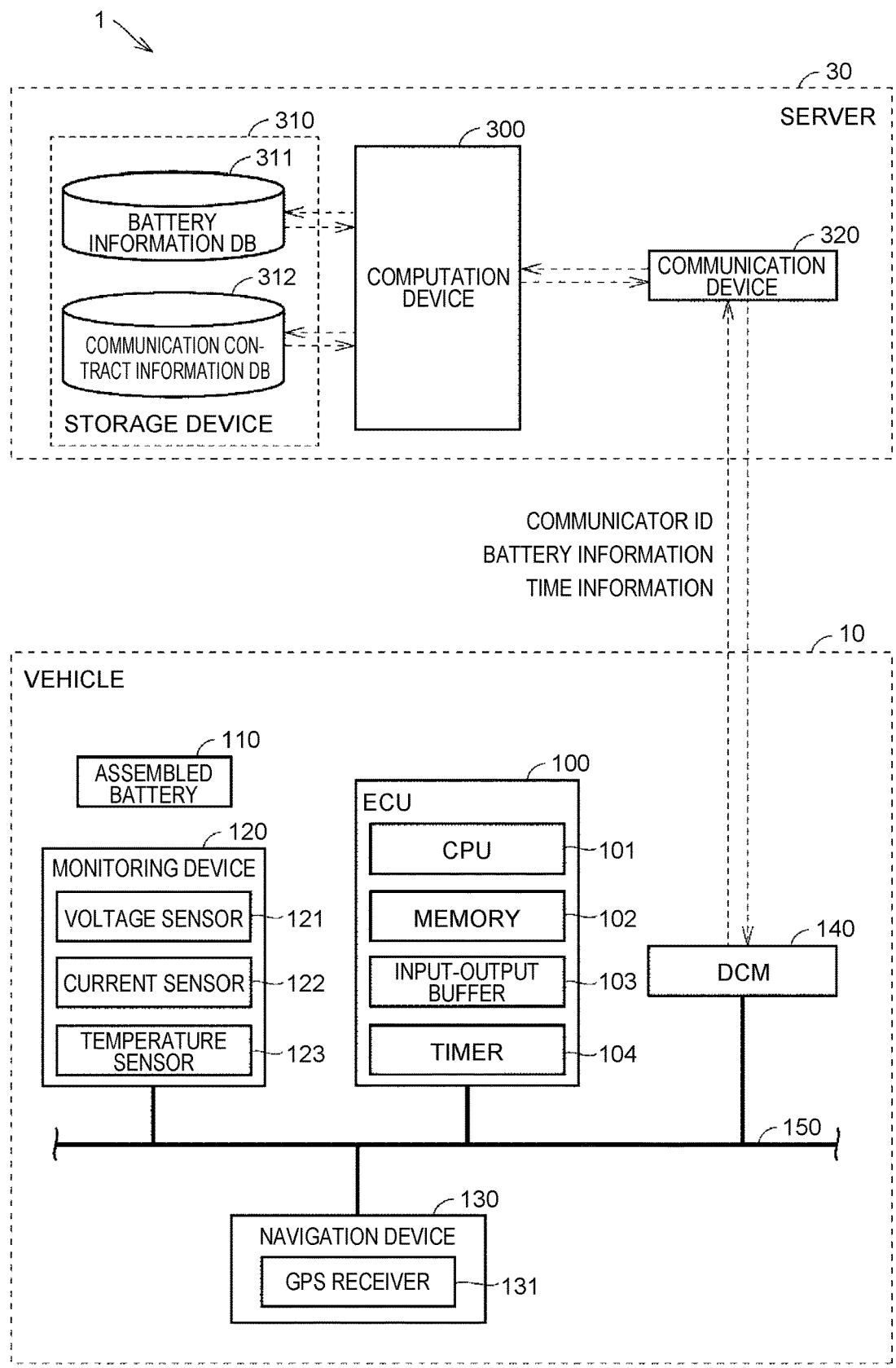
FIG. 2 is a diagram showing the configuration of the battery information collection system in more detail.

FIG. 2 is a diagram showing the configuration of the battery information collection system 1 in more detail. Each of the vehicles 20 has basically the same configuration as the vehicle 10. Therefore, in FIG. 2, for preventing complication of the figure, the illustration of the vehicles 20 is omitted, and the configuration of the vehicle 10 is illustrated as a representative.

The vehicle 10 includes an electronic control unit (ECU) 100, the assembled battery 110, a monitoring device 120, a navigation device 130, and a communication module 140. The ECU 100, the monitoring device 120, the navigation device 130 and the communication module 140 are connected with each other by a wired in-vehicle network 150 such as a controller area network (CAN).

As described above, the assembled battery 110 is configured to include a plurality of cells (not illustrated) such as lithium ion secondary batteries or nickel-hydrogen batteries. The assembled battery 110 supplies electric power for drive to an unillustrated motor generator through an unillustrated power control unit (PCU). The motor generator can generate electric power by regenerative braking. The alternating-current electric power generated by the motor generator is converted into direct-current electric power by the power control unit, and the assembled battery 110 is charged with the direct-current electric power.

The monitoring device 120 is provided for monitoring the condition of the assembled battery 110, and is configured to include a voltage sensor 121, a current sensor 122, and a temperature sensor 123. The voltage sensor 121 detects a voltage Vb of the assembled battery 110. The current sensor 122 detects a current Ib that is input to or output from the assembled battery 110. The temperature sensor 123 detects a temperature Tb of the assembled battery 110. The detection results of the sensors are sent to the ECU 100 through the in-vehicle network 150.

The navigation device 130 includes a GPS receiver 131 for identifying the position of the vehicle 10 based on electric waves from artificial satellites (not illustrated). The navigation device 130 executes various navigation processes for the vehicle 10, using the position information about the vehicle 10 identified by the GPS receiver 131 (GPS information). More specifically, the navigation device 130 overlays the current position of the vehicle 10 on a map of roads around the vehicle 10 based on the GPS information about the vehicle 10 and road map data stored in a memory (not illustrated), and then, displays the map on the navigation screen (not illustrated). The navigation device 130 performs a guidance along a recommended route from the current position of the vehicle 10 to a destination. The position information about the vehicle 10 is output also to the ECU 100 through the in-vehicle network 150.

The communication module 140 is an in-vehicle data communication module (DCM), and is configured such that the ECU 100 and the server 30 can communicate with each other bi-directionally. The communication system of the communication module 140 is not particularly limited, and for example, may be the fourth generation mobile communication, or may be a communication system with a relatively low communication speed, as exemplified by the third generation mobile communication. In the first embodiment, the communication module 140 corresponds to the "communicator" according to the disclosure.

The ECU 100 is configured to include a central processing unit (CPU) 101, a memory 102, an input-output buffer 103, and a timer 104. Based on the detection result by the monitoring device 120, the ECU 100 controls the PCU (not illustrated) such that a desired charge and a desired discharge are performed to the assembled battery 110, and generates the "battery information".

The battery information means the whole of information relevant to the condition and use situation of the assembled battery 110. Details of the battery information will be described later. As an example, the battery information can include pieces of information (voltage information, current information, and temperature information) detected by the sensors included in the monitoring device 120, and state-of-charge (SOC) information about the assembled battery 110 that is estimated based on the pieces of information. The battery information (corresponding to a record (see FIG. 3 and FIG. 4) described later) generated by the ECU 100 is sent to the server 30 through the communication module 140.

The server 30 further includes, for example, a computation device 300 that is an application server, a storage device 310, and a communication device 320. The storage device 310 includes a battery information database 311 and a communication contract information database 312 that are database servers.

The battery information database 311 contains the battery information (record) about the assembled battery 110 received from the ECU 100 of the vehicle 10, in accordance with an instruction from the computation device 300.

The communication contract information database 312 contains "communication contract information" acquired at the time of conclusion of the communication contract for the communication module 140. The communication contract information will be described later in detail.

The communication device 320 is configured to be capable of performing a bi-directional data communication with the communication module 140 equipped in the vehicle 10.

The computation device 300 collects the battery information about the vehicle 10 through the communication device 320, and stores the collected battery information in the battery information database 311. In the following, the battery information will be described in more detail.

Battery Information

The battery information can include information relevant to an index value indicating a deterioration degree of the assembled battery 110, in addition to the above-described voltage information, current information, temperature information and SOC information.

Generally, the assembled battery deteriorates due to elapse of time or repeat of charge and discharge, causing a decrease in the full charge capacity of the assembled battery and an increase in the internal resistance of the assembled battery. Accordingly, the battery information may include one or both of the full charge capacity and internal resistance of the assembled battery 110, as the index value indicating the deterioration degree of the assembled battery 110. As calculation techniques for the full charge capacity and internal resistance of the assembled battery, known techniques can be used, and hence, descriptions are omitted herein.

In the case where the assembled battery 110 is an assembled battery constituted by lithium ion secondary batteries, there can be a deterioration (a so-called high-rate deterioration) caused because the concentration distribution of lithium ions in an electrolyte becomes non-uniform due to continuous charges and discharges at high currents. The degree of the high-rate deterioration can be quantitatively evaluated (for details, see International Publication No. WO 2013/046263, for example). The battery information may include information relevant to an evaluation value indicating the degree of the high-rate deterioration of the assembled battery 110.

By collecting, as the battery information, the information relevant to the index value indicating the deterioration degree of the assembled battery 110 in this way (the index value of the full charge capacity, internal resistance or high-rate deterioration), it is possible to provide a user with services such as an estimation of a life of the assembled battery 110 and an early detection of a failure of the assembled battery 110. For example, when the assembled battery 110 deteriorates to some degree, it is possible to suggest inspection of the assembled battery 110, to the user. When the assembled battery 110 further deteriorates, it is possible to suggest replacement of the assembled battery 110, to the user. In this embodiment, the user may be an owner of the vehicle 10.

Furthermore, based on the battery information, it is possible to determine how to treat the removed assembled battery 110. For example, when the index value indicates that the assembled battery 110 has a relatively low deterioration degree, it is possible to determine that the removed assembled battery 110 is reutilized (reused or rebuilt) after maintenance of the assembled battery 110 (for example, after a performance recovery treatment for recovering the full charge capacity). On the other hand, when the index value indicates that the assembled battery 110 has a high deterioration degree, it is possible to determine that the removed assembled battery is provided for resource recycle.

The server 30 may include another database (not illustrated) containing reutilized product (reused product or rebuilt product) information about an assembled battery that is newly equipped by the replacement of the removed assembled battery 110 (another assembled battery that is a replacement candidate).

In case that the inspection, removal, replacement, reutilization and others of the assembled battery 110 are performed in this way, it is desirable to collect position information about the vehicle in addition to the battery information. By collecting the position information about the vehicle, for example, it is possible to make, for each region, demand and supply plans about how many assembled batteries can be collected and how many new assembled batteries need be prepared.

The battery information can be used also for improving an existing assembled battery or developing a novel assembled battery. The use environment of the assembled battery can be estimated from the position information about the vehicle, and therefore, also for this reason, it is desirable to collect the position information. Specifically, from the position information about the vehicle, it is possible to estimate a temperature load on the assembled battery, and for example, it is possible to estimate that a region where the assembled battery is used is a hot region or a cold region, or is a region with a large temperature difference between day and night. Further, from the position information about the vehicle, it is possible to estimate a charge-discharge load on the assembled battery, and for example, it is possible to estimate that a region where the assembled battery is used is a region where a sudden acceleration or a sudden deceleration tends to occur (that is, a region where a rapid charge-discharge of the assembled battery tends to occur). By considering such loads on the assembled battery, it is possible to adequately improve or develop the assembled battery.

For example, in the case where the vehicles 10, 20 are plug-in hybrid vehicles or electric vehicles and are configured to allow a charge (a so-called plug-in charge) using electric power to be supplied from an unillustrated charging station or the like, the battery information may include information relevant to a charging energy at the time of the plug-in charge.

Data Format of Collected Data

The battery information collection system 1 according to the first embodiment is characterized in a data format of data collected from the vehicles 10, 20 (hereinafter, also referred to as "collected data"). To facilitate understanding of the characteristic, first, a data format of collected data in a comparative example will be described below. The schematic configuration of a battery information collection system according to the comparative example is basically the same as the configuration of the battery information collection system 1 according to the first embodiment, and therefore, detailed descriptions are omitted.

Figure 3:
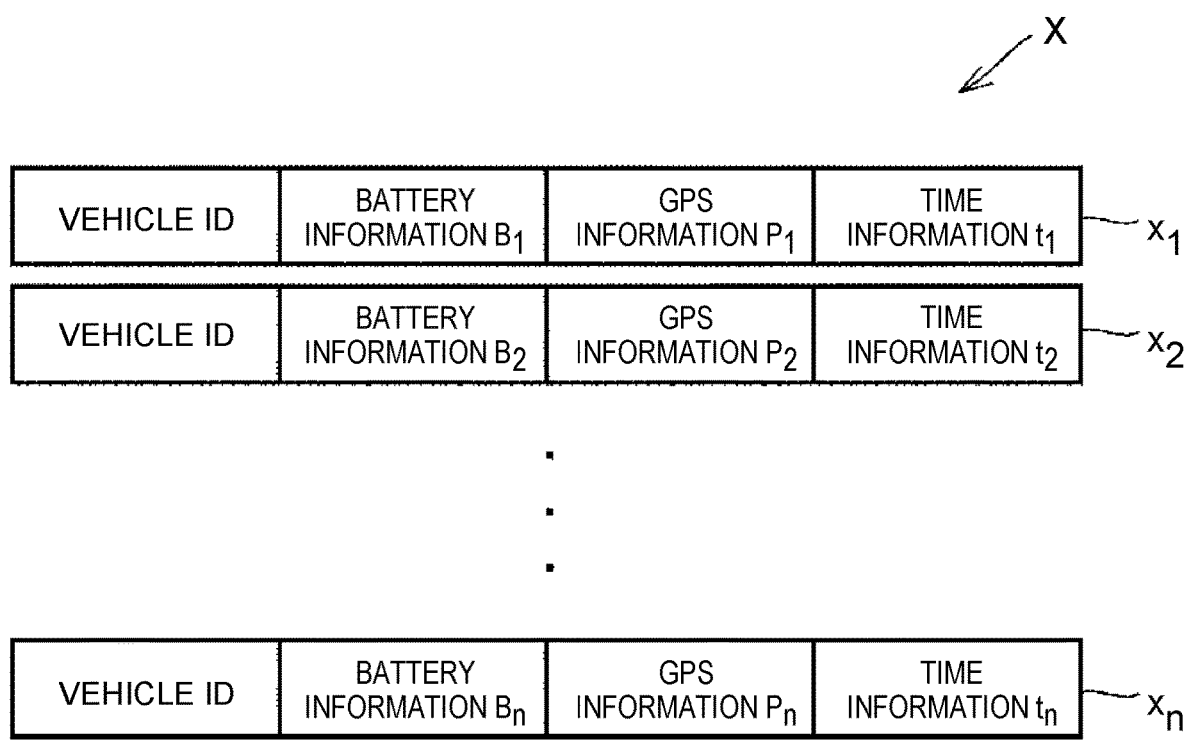
FIG. 3 is a diagram showing an example of a data format of collected data in the related art.

FIG. 3 is a diagram showing an example of the data format of collected data X in the comparative example. As shown in FIG. 3, the collected data X in the related art is configured by a plurality of records. The records are sequentially acquired by the ECU of the vehicle, and the acquired records are sent to the server. In FIG. 3, a record acquired for the n-th time (n is a natural number) is denoted by "$x_n$". When the acquisition order of the record is not particularly discriminated, the subscript "n" is omitted.

In the comparative example, the record x includes identification information about the vehicle (hereinafter, also referred to as "vehicle ID"), battery information B about the assembled battery, GPS information P indicating the position of the vehicle when the battery information B is acquired, and time information t indicating a time when the battery information B is acquired.

The GPS information P is information that indicates the longitude and latitude of the current position of the vehicle and that is acquired by the GPS receiver. In recent years, the GPS information has a very high accuracy, and typically allows the position of the vehicle to be identified with an error of several meters.

Generally, from a standpoint of protection of privacy of the user, user's approval (user's agreement) is required for collecting the position information about the vehicle. When the accuracy of the position information is high, an excessively detailed operation history of the vehicle (in other words, information relevant to routes of movements of the user) is collected, and there is a concern that the privacy of the user is not sufficiently protected. Therefore, there is a possibility that the user is negative about providing the GPS information so that it is difficult to collect the position information about the vehicle.

Meanwhile, for use purposes of the above-described battery information, highly accurate position information such as the GPS information is often unnecessary. Therefore, it is desirable to collect the position information having an accuracy appropriate for use purposes of the battery information.

Hence, the first embodiment employs a configuration of collecting the position information about the vehicles 10, 20 using identification information (hereinafter, also referred to as "communicator ID") about the communication module 140, instead of the GPS information P. When the communication module 140 is equipped in the vehicles 10, 20 and various services are provided, communication contracts are concluded between users and service providers (or manufacturers of the vehicles 10, 20). At the time of the conclusion of the communication contract, communication contract information is acquired and is stored in the communication contract information database 312. In the first embodiment, as described below, it is possible to acquire the position information having an accuracy appropriate for use purposes of the battery information about the assembled battery 110, by referring to the communication contract information.

Figure 4:
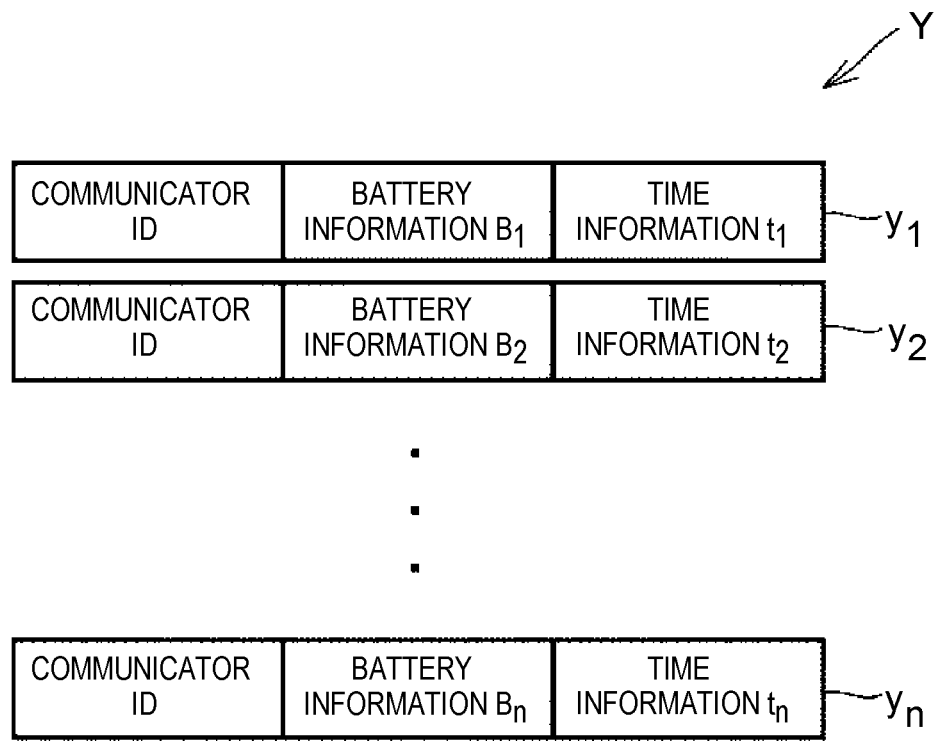
FIG. 4 is a diagram showing an example of a data format of collected data in the first embodiment.

FIG. 4 is a diagram showing an example of a data format of collected data Y in the first embodiment. With reference to FIG. 4, similarly to the comparative example, the collected data Y in the first embodiment is configured by a plurality of records that is sequentially acquired, for example, every time a predetermined period elapses (for example, every 30 seconds). A record acquired for the n-th time is denoted by "$y_n$".

The record $y_n$ includes identification information (communicator ID) about the communication module 140, battery information $B_n$ about the assembled battery 110, and time information $t_n$ indicating a time when the battery information $B_n$ is acquired. The addition of the time information t to the battery information does not need to be performed on the vehicle side, and a time when the server 30 receives the battery information may be added as the time information t.

Figure 5:
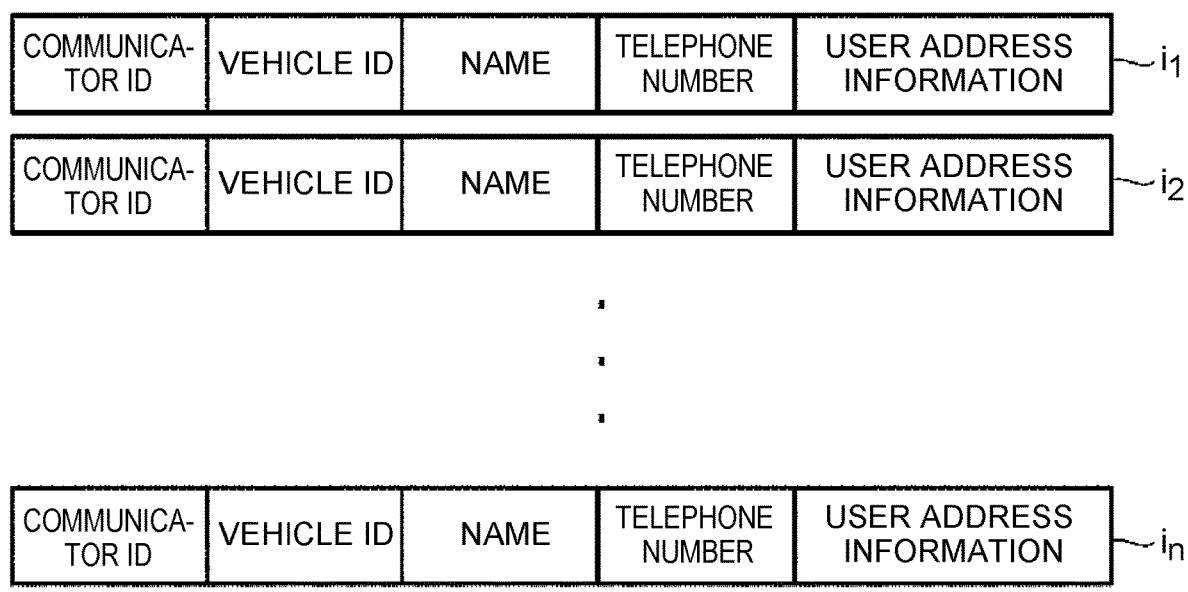
FIG. 5 is a diagram showing an example of communication contract information in the first embodiment.

FIG. 5 is a diagram showing an example of communication contract information I in the first embodiment. With reference to FIG. 5, in each record (denoted by $i_n$) of the communication contract information I, the identification information (communicator ID) about the communication module 140, the identification information (vehicle ID) about the vehicles 10, 20 equipped with the communication module 140, and personal information about the user are associated with each other. For example, the personal information about the user includes address information about the user (user address information), in addition to information relevant to user's name and user's telephone number.

For example, in the case where the communication contract is a personal contract, the user address information is information relevant to the address of user's home, and in the case where the communication contract is a corporate contract, the user address information is information relevant to the address of a business office, a service office or the like. The communication contract information I corresponds to an example of the "registration information" according to the disclosure. Further, as described later, the position of the vehicle 10 is estimated from the user address information, and therefore, the user address information corresponds to an example of the "estimation information" according to the disclosure.

As shown in FIG. 5, the correspondence relation between the communicator ID and the vehicle ID also is acquired at the time of the conclusion of the communication contract, and is stored in the communication contract information database 312. Therefore, the collected data Y described in FIG. 4 may include the vehicle ID instead of the communicator ID, or may include both of the communicator ID and the vehicle ID.

Figure 6A:
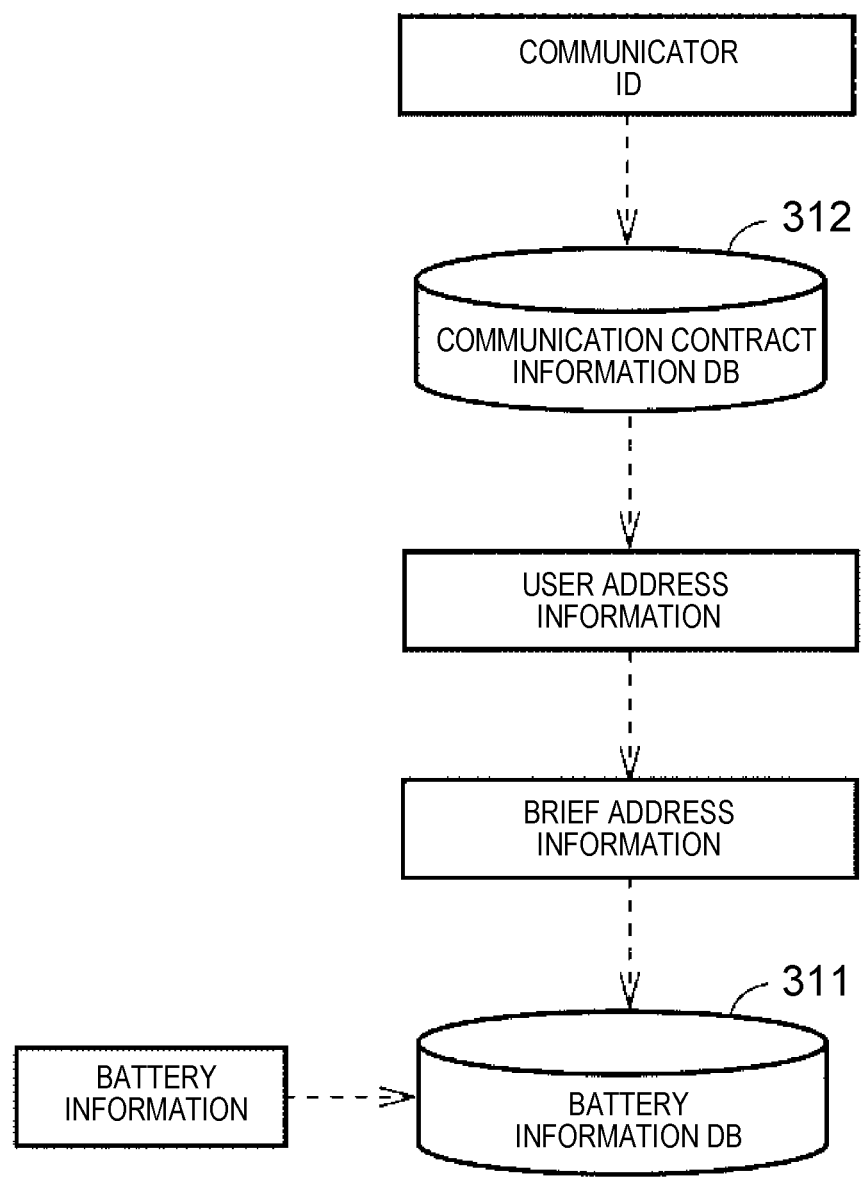
FIG. 6A is a diagram for describing a process that a computation device executes to the collected data, in the first embodiment.

FIG. 6A and FIG. 6B are diagrams for describing a process that the computation device 300 executes to the collected data Y, in the first embodiment. With reference to FIG. 6A, when the computation device 300 receives the communicator ID from the vehicles 10, 20, the computation device 300 acquires the user address information associated with the communicator ID, by referring to the communication contract information I (see FIG. 5) stored in the communication contract information database 312. Furthermore, the computation device 300 extracts a part of the acquired user address information, and stores the extracted information in the battery information database 311, in association with the battery information about the assembled battery 110, as "brief address information". In FIG. 6B, the collected data after the execution of the above process is denoted by "Y", and the n-th record is denoted by "$y'_n$".

For example, the brief address information is information in which large-scale region information of the user address information is left and small-scale region information is eliminated from the user address information. More specifically, in Japan, for example, information about classes including prefectures, countries, cites, towns and villages is left, and information about blocks, lot numbers and the like is eliminated. In the United States, for example, information about classes including states, countries, cites, towns and villages is left, and information about names of roads, lot numbers and the like is eliminated. In China, for example, information about classes including provinces, autonomous regions, cites, towns, villages and the like is left, and information about lot numbers and the like is eliminated.

In this way, in the first embodiment, the user address information associated with the communicator ID is acquired by referring to the communication contract information I, and further, the brief address information is extracted from the user address information. For use purposes of the above-described battery information, it is often only necessary to identify the positions of the vehicles 10, 20 at accuracies corresponding to regions to be extracted as the brief address information (for example, at an accuracy that makes it possible to identify a city where the vehicle is). Thus, by using relatively rough address information, it becomes hard to identify personal information about the user, and it is possible to increase the degree of privacy protection. Therefore, it is further likely to obtain user's approval about provision of the position information about the vehicle.

Here, it is not essential to extract the brief address information from the user address information, and it is allowable to use the user address information itself, without extracting the brief address information. Even in this case, it is possible to adequately protect the privacy of the user, because the user address information is fixed position information that does not indicate routes of movements of the user.

The brief address information included in the communication contract information I indicates previously registered position information, and therefore, the brief address information can be different from the actual position information about the vehicles 10, 20. For example, in the case where the address of user's home is registered as the user address information, the brief address information is different from the actual position information about the vehicle 10 during a trip of the user with the vehicle 10. As a result, the analysis accuracy for the battery information (for example, the accuracy of the estimation of the deterioration condition of the assembled battery 110) is likely to decrease.

However, basically, a period in which the vehicle 10 is positioned in the region specified by the brief address information (for example, in a region around user's home) is relatively longer than a period in which the brief address information is different from the actual position information because of a trip or the like. Accordingly, it can be said that the error between the brief address information and the actual position information has relatively little influence on the analysis accuracy for the battery information (for example, the accuracy of the estimation of the deterioration condition of the assembled battery 110). Further, by statically processing the battery information associated with the brief address information for many vehicles, it is possible to reduce the influence of the error of the position information on the analysis accuracy for the battery information, and to obtain a significant analysis result. Therefore, according to the first embodiment, it is possible to collect the position information having an accuracy sufficient for the analysis of the battery information.

In some cases, the user address information is changed due to moving of the user or the like. In response, many users make vehicles undergo periodical inspections, and therefore, provide new address information to dealers or the like, at opportunities of periodical inspections. Therefore, by the dealer, the user address information included in the communication contract information I can be updated to the latest information. Further, the communication module 140 can break down for some reason. In such a case, the communication module 140 is replaced by the dealer or the like. At the time of the replacement, the communicator ID included in the communication contract information I can be updated to a new communicator ID after the replacement.

Flow of Battery Information Collection Process

Figure 7:
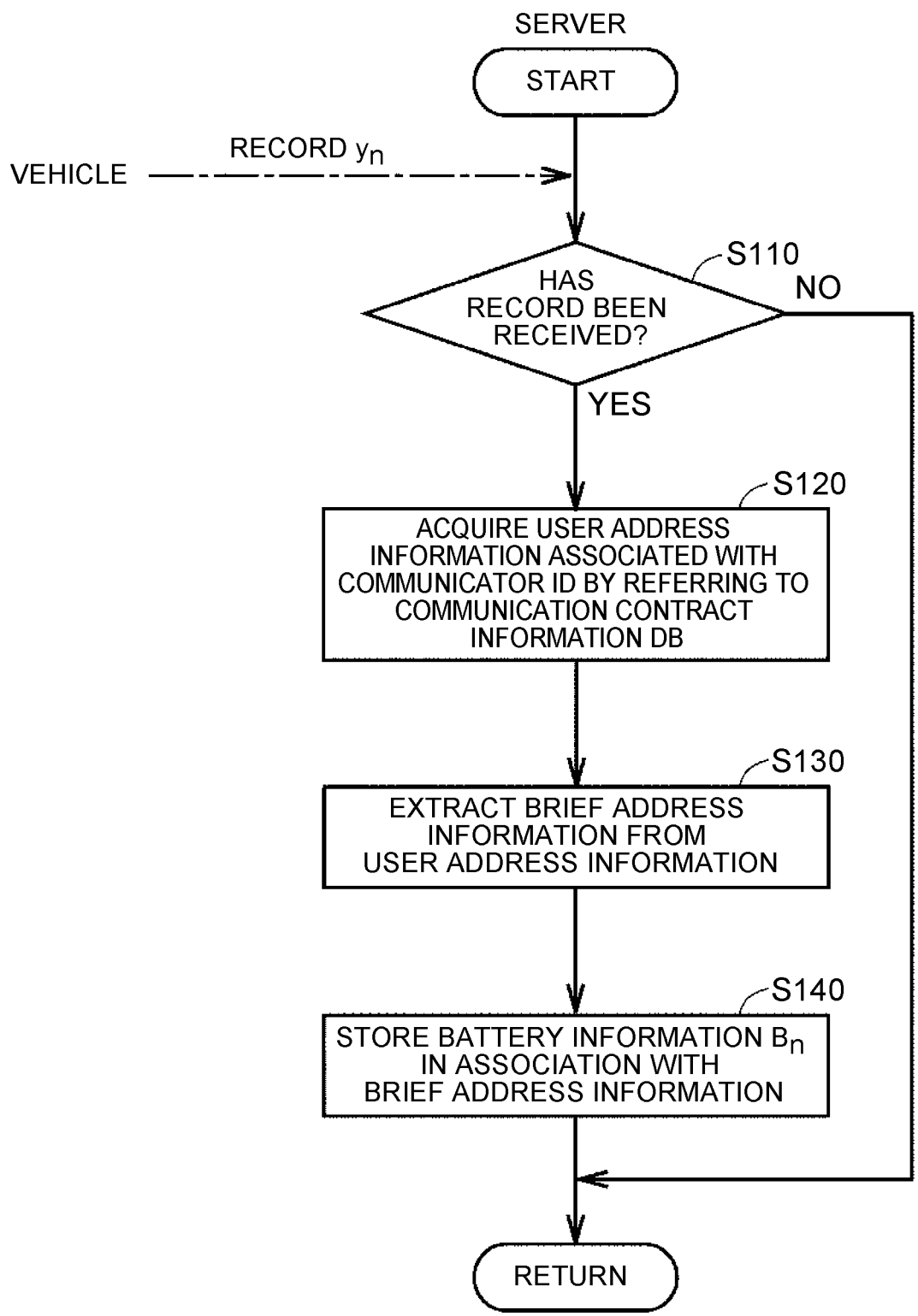
FIG. 7 is a flowchart showing a battery information collection process in the first embodiment.

FIG. 7 is a flowchart showing a battery information collection process in the first embodiment. The flowchart shown in FIG. 7 and flowcharts shown in FIG. 12 and FIG. 13 described later are called from the main routine (not illustrated) and are executed by the computation device 300, for example, every time a predetermined period elapses. Each step (hereinafter, abbreviated to "S") in these flowcharts is basically realized by software processing with the computation device 300, but may be realized by dedicated hardware (electric circuit) provided in the computation device 300.

With reference to FIG. 7, in S110, the computation device 300 determines whether the record y including the battery information B about the assembled battery 110 has been received from the vehicles 10, 20. When the record y has not been received (NO in S110), the computation device 300 returns the process to the main routine. When the record y has been received (YES in S110), the computation device 300, in subsequent S120 to S140, executes processes for storing the record y in the battery information database 311, in sequence.

Specifically, in S120, the computation device 300 acquires the user address information associated with the communicator ID, by referring to the communication contract information I (see FIG. 5) stored in the communication contract information database 312.

In S130, the computation device 300 extracts the brief address information from the user address information acquired in S120. This process has been described in detail with FIG. 6A, and therefore, the description is omitted.

In S140, the computation device 300 stores the battery information B acquired from the vehicles 10, 20 in the battery information database 311, in association with the brief address information extracted in S130 (see FIG. 6B).

Thus, according to the first embodiment, the communicator ID is sent from the communication module 140 to the computation device 300, in addition to the battery information B about the assembled battery 110. The computation device 300 acquires the user address information associated with the communicator ID, by referring to the communication contract information I stored in the communication contract information database 312. Then, the computation device 300 processes the user address information to the brief address information having a lower accuracy, and stores the brief address information in the battery information database 311 in association with the battery information B about the assembled battery 110, as the position information about the vehicles 10, 20. Thereby, it is possible to acquire the position information having an accuracy appropriate for use purposes of the battery information B, while protecting the privacy of the user.

FIG. 7 shows an example in which the processes of S120 to S140 are executed whenever the record is received. However, the processes of S120 and S130 only need to be executed once when a predetermined condition is satisfied (for example, when a predetermined period elapses). After the processes of S120 and S130 are executed once, only the process of S140 may be executed whenever the record is received.

Modification of First Embodiment

It is not necessary that the battery information database 311 and the communication contract information database 312 are provided in the same server as the computation device 300 as shown in the first embodiment. As described below, the battery information database 311 and the communication contract information database 312 may be provided in a separate server from the computation device 300.

Figure 8:
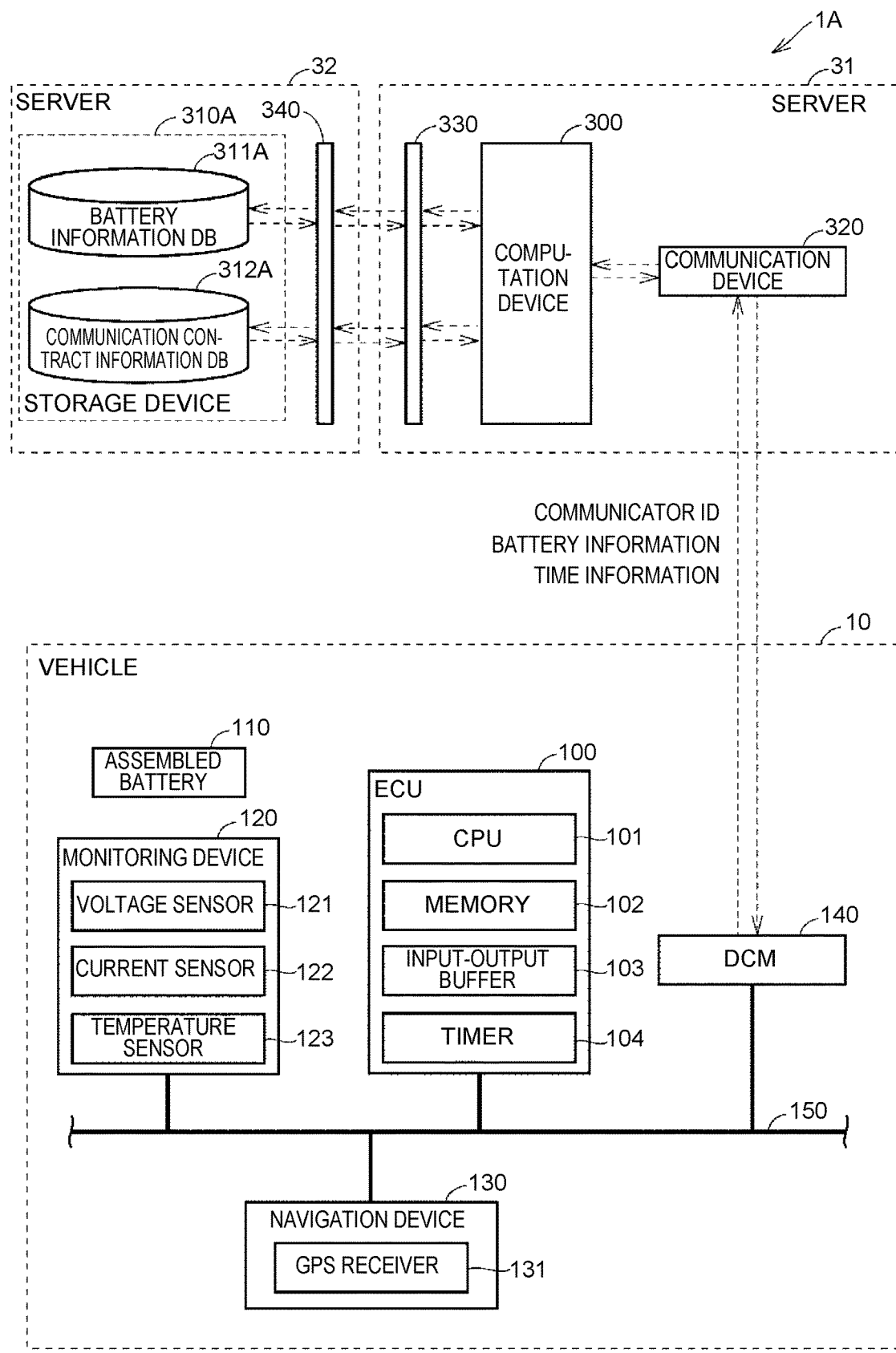
FIG. 8 is a diagram showing the configuration of a battery information collection system according to a modification of the first embodiment.

FIG. 8 is a diagram showing the configuration of a battery information collection system 1A according to a modification of the first embodiment. With reference to FIG. 8, the battery information collection system 1A includes two servers 31, 32. The server 31 includes the computation device 300, the communication device 320, and an input-output interface 330. The server 32 includes a battery information database 311A, a communication contract information database 312A, and an input-output interface 340. The input-output interfaces 330, 340 are configured to allow a variety of information to be exchanged between the computation device 300 and the storage device 310A (the battery information database 311A and the communication contract information database 312A).

Even when the battery information database 311 and the communication contract information database 312 are provided in a separate server from the computation device 300 in this way, it is possible to acquire the position information having an accuracy appropriate for the battery information B while protecting the privacy of the user, similarly to the first embodiment.

In the example described in the first embodiment, the computation device 300 executes both the process of acquiring the user address information associated with the communicator ID and the process of extracting the brief address information from the user address information. However, although not illustrated, the two kinds of processes may be executed by a device integrally configured by the computation device 300 and the storage device 310 (310A).

Second Modification of First Embodiment

In the example described in the first embodiment (and the modification), the battery information B about the assembled battery 110 and the like are sent from the communication module (DCM) 140 equipped in the vehicles 10, 20 to the server 30, but the configuration for sending the battery information B to the server 30 is not limited to this. In a second modification of the embodiment, a configuration in which the battery information B and the like are sent from a portable terminal of the user will be described.

Figure 9:
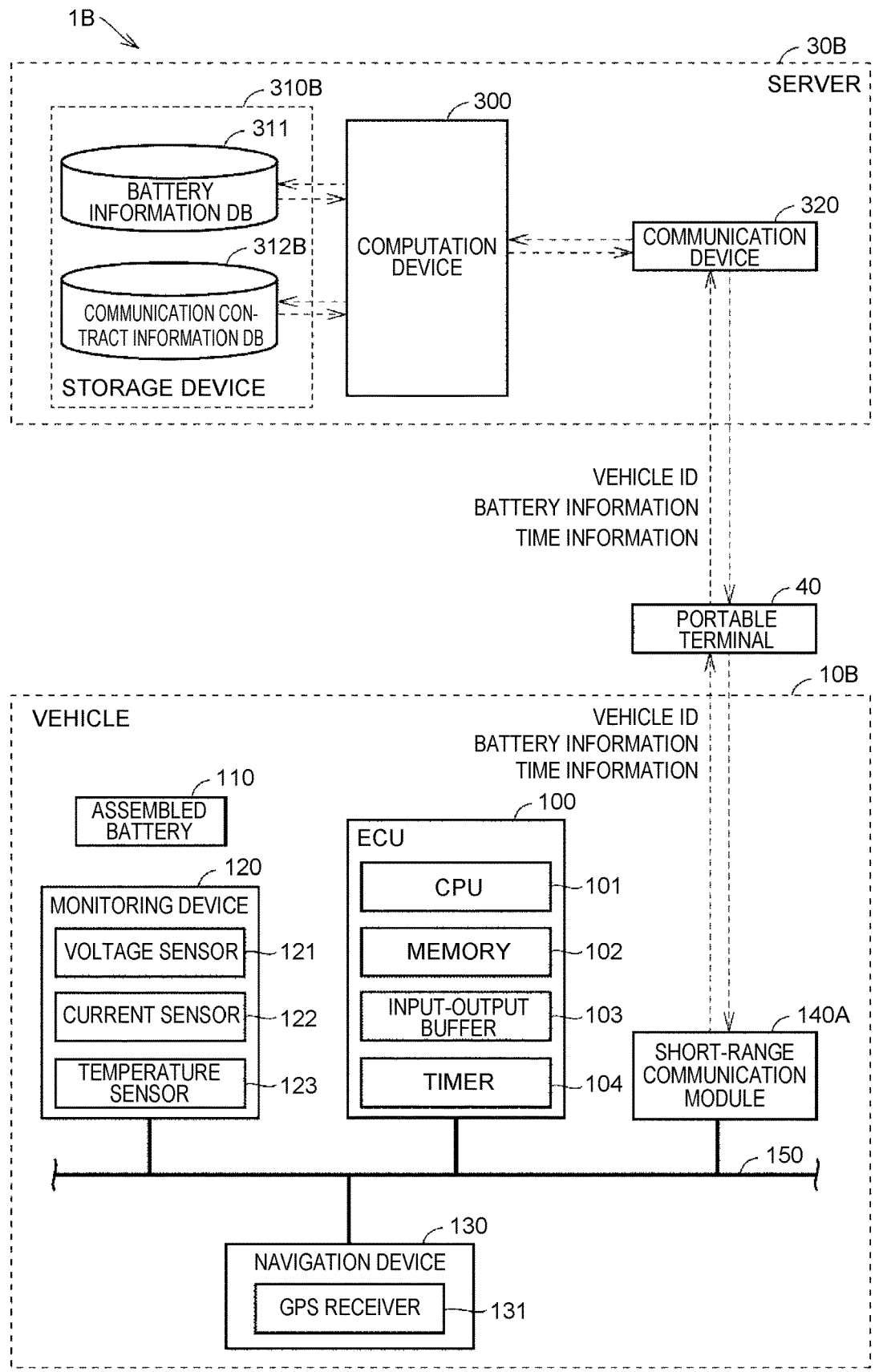
FIG. 9 is a diagram showing the configuration of a battery information collection system according to a second modification of the first embodiment.

FIG. 9 is a diagram showing the configuration of a battery information collection system 1B according to the second modification of the first embodiment. With reference to FIG. 9, a server 30B of the battery information collection system 1B includes a storage device 310B. The storage device 310B is different from the storage device 310 (see FIG. 2) in the first embodiment, in that a communication contract information database 312B is included instead of the communication contract information database 312. The communication contract information database 312B contains the communication contract information I acquired at the time of conclusion of a communication contract for a portable terminal 40. The communication contract information is basically the same as the communication contract information I shown in FIG. 5.

A vehicle 10B is different from the vehicle 10 (see FIG. 2) in the first embodiment, in that a short-range communication module 140A is included instead of the communication module 140. The short-range communication module 140A is configured to be incapable of communicating directly with the communication device 320 provided in the server 30B but capable of performing a short-range communication with the portable terminal 40 of the user. The short-range communication means a bi-directional communication in which the longest communication distance is, for example, several meters to several tens of meters, and for example, is a communication in which a mutual authentication process (a so-called pairing) between the short-range communication module 140A and the portable terminal 40 is performed before the sending and receiving of a main information part.

The portable terminal 40 is a communication apparatus such as a smartphone, and is configured to be capable of communicating with the short-range communication module 140A and capable of communicating with the communication device 320 in a server 30A. In the second modification, the portable terminal 40 corresponds to the "communicator" according to the disclosure. However, the portable terminal and the vehicle (a communication interface provided in the vehicle) do not need to perform wireless communication, and the portable terminal and the vehicle may perform wire communication.

In the battery information collection system 1B configured as described above, the portable terminal 40 acquires the battery information B about the assembled battery 110 through the short-range communication module 140A. Then, the portable terminal 40 adds the vehicle ID (the ID of the portable terminal 40 may be adopted in the case where the vehicle ID and the ID of the portable terminal 40 are associated with each other) to the battery information B acquired from the short-range communication module 140A, and sends the battery information B to the computation device 300 in the server 30B. Similarly to the first embodiment, the computation device 300 acquires the user address information associated with the vehicle ID, by referring to the user registration information stored in the communication contract information database 312B, and extracts the brief address information from the acquired address information. The sequence of processes is the same as the sequence of processes in the flowchart shown in FIG. 7, and therefore, detailed descriptions are omitted.

Also in the second modification of the first embodiment, by using the communication contract information I acquired at the time of the conclusion of the communication contract for the portable terminal 40, it is possible to acquire the position information having an accuracy appropriate for the battery information B while protecting the privacy of the user, similarly to the first embodiment (or the modification).

Second Embodiment

In the example described in the first embodiment, the user address information for the vehicles 10, 20 is acquired from the communication contract information I. However, information other than the user address information may be used if the information allows the positions of the vehicles 10, 20 to be estimated. In a second embodiment, a configuration in which the positions of the vehicles 10, 20 are estimated using dealer address information or number plate information will be described.

Figure 10:
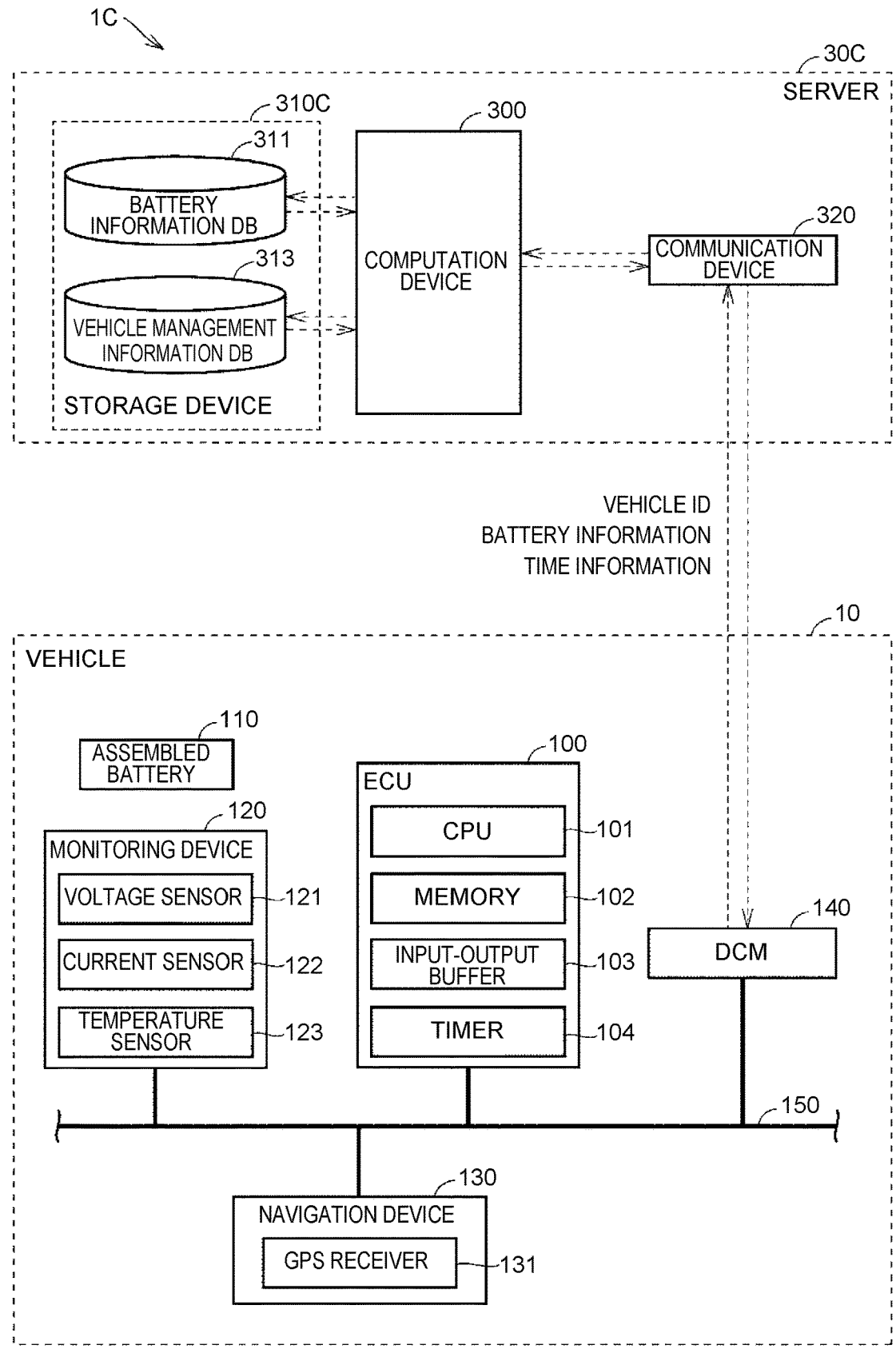
FIG. 10 is a diagram schematically showing the whole configuration of a battery information collection system according to a second embodiment.

FIG. 10 is a diagram schematically showing the whole configuration of a battery information collection system 1C according to the second embodiment. With reference to FIG. 10, a server 30C of the battery information collection system 1C is different from the server 30 (see FIG. 1) in the first embodiment, in that a storage device 310C is included instead of the storage device 310. The storage device 310C includes a vehicle management information database 313 instead of the communication contract information database 312.

The vehicle management information database 313 contains "vehicle management information" that is management information about the vehicle for the sale, inspection, maintenance and repair of the vehicles 10, 20. The vehicle management information corresponds to another example of the "registration information" according to the disclosure.

The other constituents of the server 30C are the same as the corresponding constituents of the server 30 in the first embodiment. The configuration of the vehicle 10 is the same as the configuration of the vehicle 10 in the first embodiment. Accordingly, descriptions of the other constituents of the server 30C and the configuration of the vehicle 10 are omitted.

Figure 11:
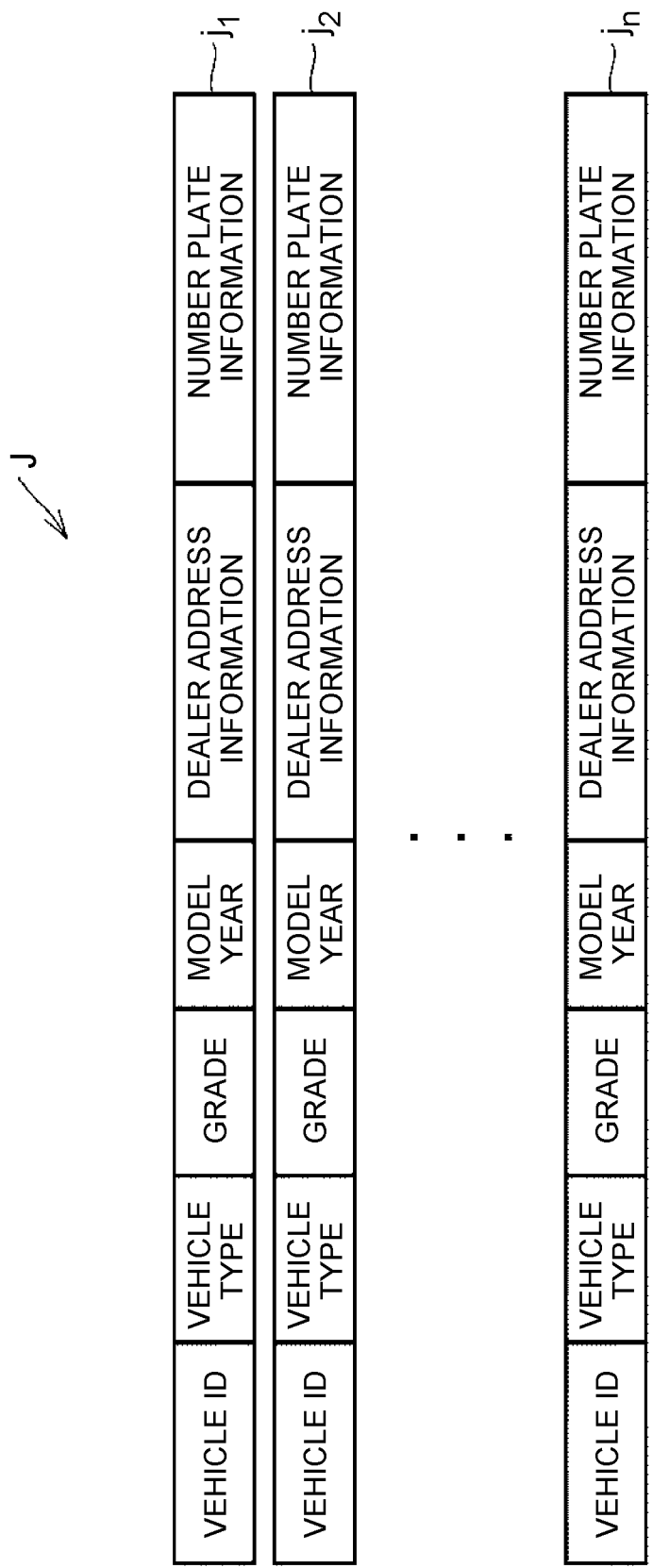
FIG. 11 is a diagram showing an example of vehicle management information in the second embodiment.

FIG. 11 is a diagram showing an example of vehicle management information J in the second embodiment. With reference to FIG. 11, in each record (denoted by $j_n$) of the vehicle management information J, the identification information (vehicle ID) about the vehicles 10, 20 and a variety of information relevant to the vehicles 10, 20 are associated with each other. Specifically, the vehicle management information J includes information relevant to vehicle type, grade and model year of each of the vehicles 10, 20, the dealer address information, and the number plate information.

The dealer address information is address information about a dealer that takes care of the sale, inspection, maintenance and repair of the vehicles 10, 20. Many users purchases vehicles at dealers near user's homes, and request the inspection or the like of the vehicles to the dealers after the purchase. Accordingly, it can be said that each of the vehicles 10, 20 is in a region indicated by the dealer address information for a long period. Therefore, similarly to the user address information, the dealer address information can be used as information for estimating positions of the vehicles 10, 20.

The dealer address information is registered in the vehicle management information database 313, for example, at the time of the sale of the vehicles 10, 20. However, after the sale of the vehicles 10, 20, users can perform moving. Even in such a case, the vehicles 10, 20 are periodically inspected or maintained, and as necessary, are repaired. Therefore, users continuously request the inspection or the like, to distributors near the destination of the moving. At the opportunity of the inspection or the like, it is possible to update the dealer address information to the latest information.

The number plate information is information written on number plates that are attached to the vehicles 10, 20 (information corresponding to the number plate). Specifically, the number plate information includes information relevant to the names of regions where the inspection and registration of the vehicles 10, 20 are performed. In Japan, for example, the name of the region is the name of a prefecture or a city (a territory of a motor vehicle official). In the United States, for example, the name of the region is the name of a state or a country. In China, for example, the name of the region is the name of a province or an autonomous region. Each of the vehicles 10, 20 is in a region indicated by regional information, for a long period, and therefore, the regional information can be used as information for estimating positions of the vehicles 10, 20, similarly to the user address information and the dealer address information.

The vehicle management information J may include the communicator ID in addition to the vehicle ID. The vehicle management information J does not need to include both of the dealer address information and the number plate information, and may include only one of them.

Figure 12:
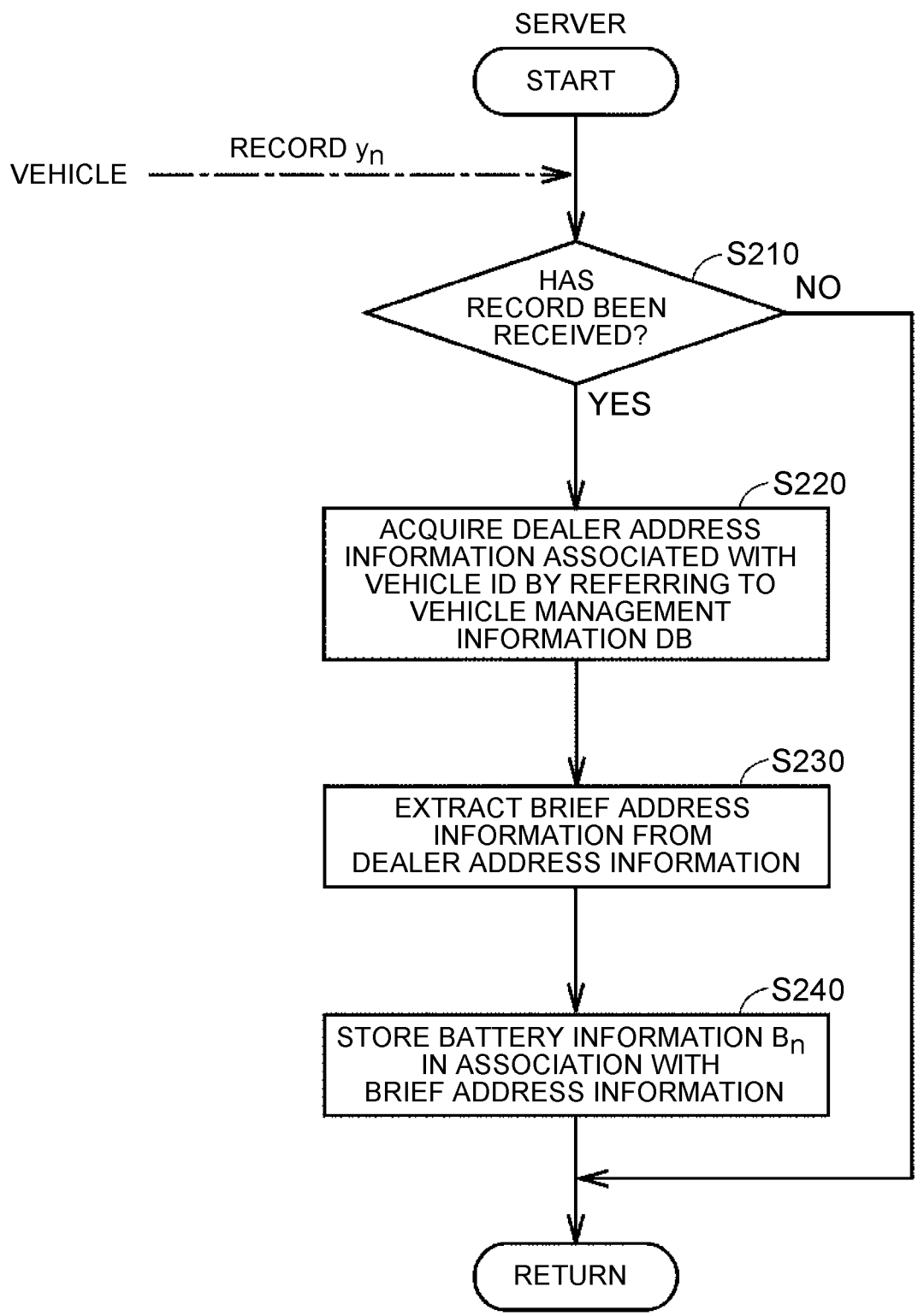
FIG. 12 is a flowchart showing an example of a battery information collection process in the second embodiment.

FIG. 12 is a flowchart showing an example of a battery information collection process in the second embodiment. With reference to FIG. 12, in S210, the computation device 300 determines whether the record y including the battery information B about the assembled battery 110 has been received from the vehicle 10.

When the record y has been received (YES in S210), the computation device 300 acquires the dealer address information associated with the vehicle ID, by referring to the vehicle management information J (see FIG. 9) stored in the vehicle management information database 313 (S220). Further, the computation device 300 extracts the brief address information from the dealer address information, similarly to the first embodiment (S230). Then, in S240, the computation device 300 stores the battery information B acquired from the vehicle 10 in the battery information database 311, in association with the brief address information.

Figure 13:
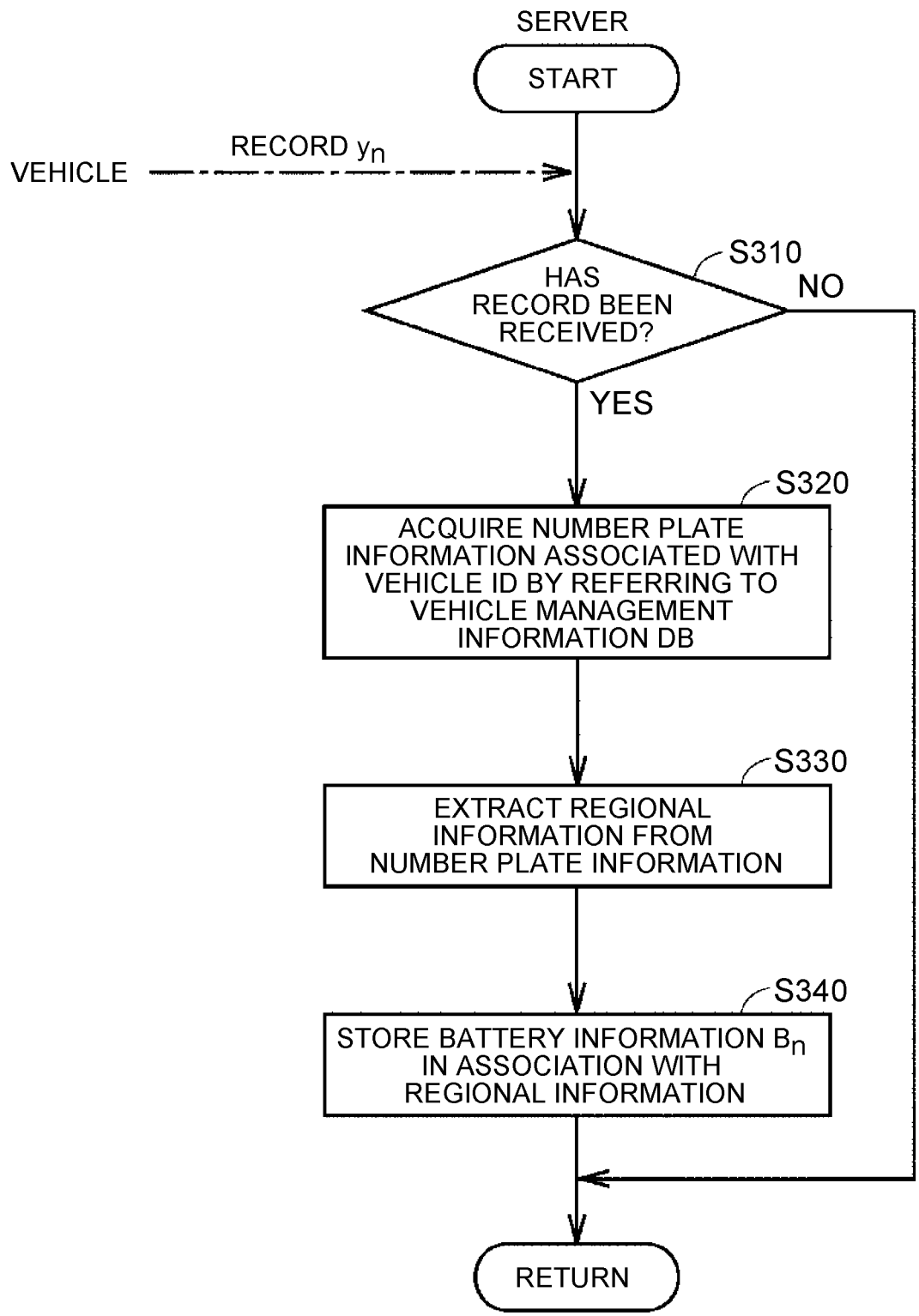
FIG. 13 is a flowchart showing another example of the battery information collection process in the second embodiment.

FIG. 13 is a flowchart showing another example of the battery information collection process in the second embodiment. With reference to FIG. 13, when the record y has been received (YES in S310), the computation device 300 acquires the number plate information associated with the vehicle ID, by referring to the vehicle management information J (see FIG. 9) stored in the vehicle management information database 313 (S320). Further, the computation device 300 extracts the regional information from the number plate information (S330). Then, the computation device 300 stores the battery information B acquired from the vehicle 10 in the battery information database 311, in association with the regional information (S340).

Thus, according to the second embodiment, the dealer address information or number plate information corresponding to the vehicle ID (or the communicator ID) is acquired by referring to the vehicle management information J. By using the dealer address information or the number plate information, it is possible to roughly estimate the position of the vehicle 10, without collecting the information relevant to routes of movements of the user. Accordingly, it is possible to acquire the position information having an accuracy appropriate for use purposes of the battery information B, while protecting the privacy of the user.

Also in the second embodiment, as described in the modification of the first embodiment, the storage device 310C (the battery information database 311 and the vehicle management information database 313) may be provided in a separate server from the computation device 300.

It should be understood that the embodiments disclosed herein are examples and are not limiting in all respects. The scope of the disclosure is shown by the claims instead of the above description of the embodiments, and is intended to include all modifications in meanings and scopes equivalent to the claims.

What is claimed is:
1. An information collection system for an electric storage device, the information collection system comprising:
    a database server in which registration information is stored, the registration information being information in which estimation information and identification information are associated with each other, the estimation information being different from position information using a global positioning system and allowing an estimation of a position of an object vehicle, the identification information identifying the object vehicle of a plurality of vehicles; and an application server configured to:
receive, from a communicator of the object vehicle, the identification information and electric storage device information indicating information about an electric storage device equipped in the object vehicle;

acquire the estimation information associated with the identification information by referring to the registration information;

extract brief address information, that is a subset of the estimation information, from the estimation information;

store the brief address information with the electric storage device information; and provide the electric storage device information based on storing the brief address information with the electric storage device information.

2. The information collection system for the electric storage device according to claim 1, wherein:
the estimation information is address information about a user of the object vehicle, and
the brief address information is the subset of the address information about the user.

3. The information collection system for the electric storage device according to claim 2, wherein the address information about the user is previously acquired at a time of conclusion of a communication service contract concluded by the user.

4. The information collection system for the electric storage device according to claim 2, wherein the address information about the user is acquired at a time of at least one of sale, inspection, maintenance, and repair of the object vehicle.

5. The information collection system for the electric storage device according to claim 1, wherein:
the estimation information is address information about a store that performs at least one of sale, inspection, maintenance, and repair of the object vehicle, and
the brief address information is the subset of the address information about the store.

6. The information collection system for the electric storage device according to claim 1, wherein:
the estimation information is regional information corresponding to a number plate of the object vehicle, and
the brief address information is the subset of the regional information.

7. The information collection system for the electric storage device according to claim 1, wherein the identification information is a communication identifier of the communicator.

8. An information collection system for an electric storage device, the information collection system comprising:
an application server configured to acquire electric storage device information about an object vehicle of a plurality of vehicles, by communication with a communicator provided in the object vehicle, the electric storage device information indicating information about an electric storage device equipped in the object vehicle;

a communication interface configured to connect the application server and a database server, the database server configured to store registration information, the registration information being information in which identification information identifying the object vehicle and estimation information allowing an estimation of a position of the object vehicle are associated with each other, wherein:

the estimation information is information different from position information about the object vehicle that is sent from a global positioning system, and the application server is configured to:
receive, from the communicator of the object vehicle, the identification information and the electric storage device information, acquire the estimation information associated with the identification information by referring to the registration information;

extract brief address information, that is a subset of the estimation information, from the estimation information;

store the brief address information in the database server in association with the electric storage device information; and provide the electric storage device information based on associating the brief address information with the electric storage device information.

9. The information collection system for the electric storage device according to claim 8, wherein the application server is positioned separately from the database server.

10. A method comprising:
receiving, by a server and from a database server, registration information that associates position estimation information of a vehicle and identification information of the vehicle;

receiving, by the server and from the vehicle, electric storage device information that is associated with the identification information of the vehicle;

acquiring, by the server, the position estimation information, based on the identification information of the vehicle received from the vehicle and the registration information received from the database server;

extracting by the server, brief address information, that is a subset of the position estimation information, from the position estimation information;

storing, by the server, the brief address information of the vehicle and the electric storage device information, based on acquiring the position estimation information; and providing, by the server, the electric storage device information that is associated with the brief address information.

* * * * *